United States Patent [19]
Gonthier et al.

[11] Patent Number: 5,796,885
[45] Date of Patent: Aug. 18, 1998

[54] 3×3 WAVEGUIDE COUPLER FOR BIDIRECTIONAL DUAL WAVELENGTH TRANSMISSION AND SIGNAL SAMPLING AND METHOD FOR MAKING THE SAME

[76] Inventors: Francois Gonthier, 8582 rue Rene-Labelle, Montreal (Quebec), Canada, H2M 2L7; Robert G. Files, 136 King Street, Mount Albert (Ontario), Canada, L0G 1M0; Paul Rivett, 42 Kimbolton Court, Scarbourough (Ontario), Canada, M1C 3G2

[21] Appl. No.: 647,172

[22] Filed: May 9, 1996

[51] Int. Cl.⁶ .................................................. G02B 6/26
[52] U.S. Cl. ............................................................ 385/15
[58] Field of Search ........................ 65/384, 402, 408; 156/153, 158; 385/12, 14, 22, 40, 42, 43, 47, 50, 79

[56] References Cited

U.S. PATENT DOCUMENTS

| | | | |
|---|---|---|---|
| 3,808,549 | 4/1974 | Maurer | 385/130 |
| 3,936,143 | 2/1976 | Sato | 385/67 |
| 4,124,272 | 11/1978 | Henderson et al. | 385/26 |
| 4,213,677 | 7/1980 | Sugimoto et al. | 385/47 |
| 4,229,068 | 10/1980 | Hodge et al. | 385/22 |
| 4,239,331 | 12/1980 | Aoyama | 385/16 |
| 4,296,995 | 10/1981 | Bickel | 385/47 |
| 4,423,923 | 1/1984 | Frazier et al. | 156/158 |
| 4,426,215 | 1/1984 | Murphy | 65/402 |
| 4,431,260 | 2/1984 | Palmer | 385/42 |
| 4,452,505 | 6/1984 | Gasparian | 385/47 |
| 4,465,335 | 8/1984 | Eppes | 385/50 |
| 4,468,085 | 8/1984 | Papuchon et al. | 385/14 |
| 4,509,827 | 4/1985 | Cowen et al. | 385/79 |
| 4,550,974 | 11/1985 | Murphy | 385/43 |
| 4,550,975 | 11/1985 | Levinson et al. | 385/47 |
| 4,630,255 | 12/1986 | Gouali et al. | 385/47 |
| 4,637,682 | 1/1987 | Mahlein et al. | 385/47 |
| 4,708,423 | 11/1987 | Erman et al. | 385/14 |
| 4,733,931 | 3/1988 | Fan | 385/33 |
| 4,765,816 | 8/1988 | Bjornlie et al. | 65/384 |
| 4,772,084 | 9/1988 | Bogert | 385/40 |
| 4,822,128 | 4/1989 | Imoto et al. | 385/43 |
| 4,844,573 | 7/1989 | Gillham et al. | 65/408 |
| 4,867,520 | 9/1989 | Weidel | 385/24 |
| 4,878,727 | 11/1989 | Boiarski et al. | 385/14 |
| 4,895,423 | 1/1990 | Bilodeau et al. | 385/12 |
| 4,932,742 | 6/1990 | Tohme | 385/15 |

(List continued on next page.)

FOREIGN PATENT DOCUMENTS

| | | |
|---|---|---|
| 0210072 | 7/1986 | European Pat. Off. |
| 3603856 | 8/1987 | Germany . |

OTHER PUBLICATIONS

Elektrolytische Hochleistungsverzinkung von Stahlband durch mechanische Grenzschichtbeeingflussung, Metalloberflache 36 (1982) (no month).

*Introduction to Fiber Optics*, Chapter 6.5.6 Couplers, pp. 341–343, published by McGraw-Hill, Inc., 1993.

*Primary Examiner*—Akm E. Ullah
*Attorney, Agent, or Firm*—Ware, Fressola, Van Der Sluys & Adolphson LLP

[57] ABSTRACT

The invention provides an optic coupler for a fiber optic system, having a single coupler, a first optical, a second optical port, a system port and a detector port. The first optical port responds to and provides a first forward optical signal. The second optical port responds to and provides a second forward optical signal. The single coupler responds to the first forward optical signal and the second forward optical signal, for providing a coupled first and second forward optical signal. The single coupler also responds to a combined first and second reverse optical signal, for providing a coupled first and second reverse optical signal. The system port responds to and provides the coupled first and second forward optical signal to the fiber optic system. The system port also responds to and provides the combined first and second reverse optical signal to the single coupler. The detector port responds to and provides the coupled first and second reverse optical signal to a detector.

18 Claims, 5 Drawing Sheets

3 × 3 coupler used as a 3 × 1 coupler which performs the same functions as the two couplers of FIG. 1. The signal directions and maximum insertion loss specifications are noted on the appropriate ports.

U.S. PATENT DOCUMENTS

| | | | |
|---|---|---|---|
| 4,961,801 | 10/1990 | Gasparian | 156/153 |
| 4,989,946 | 2/1991 | Williams et al. | 385/16 |
| 5,009,692 | 4/1991 | Miller et al. | 385/50 |
| 5,031,984 | 7/1991 | Eide et al. | 385/27 |
| 5,131,062 | 7/1992 | Eide et al. | 385/47 |
| 5,170,451 | 12/1992 | Ohshima | 385/43 |
| 5,195,151 | 3/1993 | Campbell, Jr. et al. | 385/43 |
| 5,459,804 | 10/1995 | Stowe | 385/42 |

FIG. 1 PRIOR ART. Coupler arrangement for a bidirectional dual wavelength system. The WDM multiplexes the two forward propagating wavelengths and the wavelength flatten 3 dB coupler allows signal coming back to be partially routed to the detector.

FIG. 2 3 x 3 coupler used as a 3 x 1 coupler which performs the same functions as the two couplers of FIG. 1. The signal directions and maximum insertion loss specifications are noted on the appropriate ports.

FIG. 3 Planar fiber arrangement for the 3 x 3 coupler

Insertion for P1 (@ 1310 ± 30 nm & 1550 ± 30 nm) > 4 dB
Insertion for P2 (@ 1310 ± 30 nm) > 4 dB
Insertion for P3 (@ 1550 ± 30 nm) > 4 dB

FIG. 4 Equivalent unidirectional properties that a 3 x 3 coupler must have to meet the 4 dB insertion loss specification described in FIG. 2.

FIG. 5 Example of elongation.

FIG. 6 Wavelength response of coupler

FIG. 7 Insertion loss in each branch in dB as a funtion of wavelength

FIG. 8 Power loss of the lasers if it was reflected back to the detector through the device

FIG. 9 Experimental response of a tuned 1 x 3 coupler

FIG. 10 Double pass response of the 1 x 3 coupler in FIG. 9.

FIG. 11(a) Coupler used in a 3 x 3 configuration

FIG. 11(b) Coupler used in a 2 x 3 configuration

3×3 WAVEGUIDE COUPLER FOR BIDIRECTIONAL DUAL WAVELENGTH TRANSMISSION AND SIGNAL SAMPLING AND METHOD FOR MAKING THE SAME

FIELD OF INVENTION

The present invention relates to fiber optic couplers and optical waveguide couplers.

BACKGROUND OF THE INVENTION

Fiber optics couplers provide a means of exchanging optical power between several optical fibers. The fiber optic couplers are used to distribute power or combine signals between fibers or to multiplex different wavelengths in a fiber system. Using these two basic functions, couplers or combinations of couplers can be used to build distribution networks, multiwavelengths systems or implement bidirectional transmissions on fiber links. The simple form of the latter systems is to connect on an input of the optical fiber a 2×1 coupler that has a 3 dB splitting ratio. This coupler has two input leads that can be connected to a transmitter and a detector. In a forward direction, power from the transmitter is coupled to the output port of the coupler with a 3 dB loss. Reversely, in the other direction, a signal coming from the optical fiber to the coupler is divided in two, one 3 dB signal going back in the transmitter (power which is lost) and another 3 dB signal going to a detector. This arrangement thus allows a bidirectional transmission on a single optical fiber, with a 3 dB power penalty at each coupler.

Figure 1:
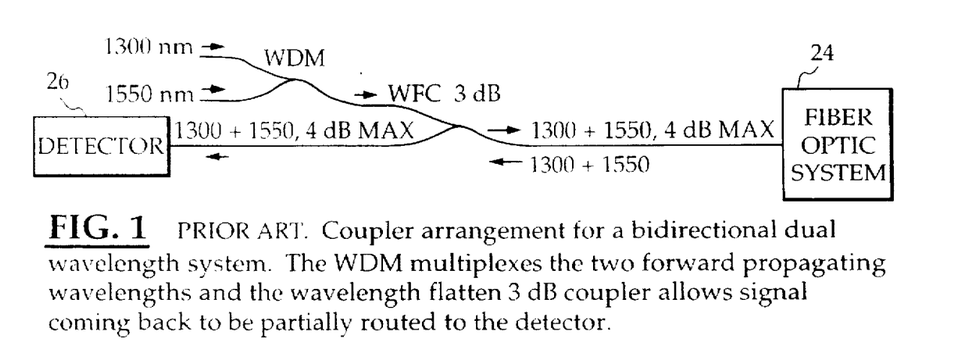
FIG. 1 is a diagram of a coupler arrangement for a bidirectional dual wavelength system that is known in the prior art.

To avoid this penalty, some systems have been designed to use wavelength multiplexing/demultiplexing couplers. In this case, two different wavelengths are used, one in the forward direction and one in the reverse direction. The 2×1 couplers used are multiplexing couplers usually called wavelength division multiplexing (WDM) couplers that are able to combine two wavelengths injected in the two input fibers in the single output port, without any insertion loss penalty. This system can operate bidirectionally without the 3 dB excess loss penalty of the 3 dB splitter, but it does not use the full capacity of the optical fiber that can transmit both wavelengths in both directions. To realize such a system, it is known in prior art to use a WDM coupler in combination with a 3 dB splitter as shown in FIG. 1. The two wavelengths are first combined on a single fiber using a WDM coupler. These signals then pass through the 3 dB splitter to permit the return signal to reach a detector. The system in FIG. 1 works, but has an important disadvantage in that it uses 2 components which have to be assembled together, and results in undesirable system power loss. Another flattened 3×3 coupler provides an equal splitting ratio but with a minimum of a 4.8 dB loss.

In a prior art search, the following patents were uncovered: U.S. Pat. No. 4,772,084, U.S. Pat. No. 5,009,692, U.S. Pat. No. 5,170,451, U.S. Pat. No. 5,195,151, and U.S. Pat. No. 5,459,804, all hereby incorporated by reference. U.S. Pat. No. 4,772,084 discloses an optical waveguide power splitter which Includes a 3×3 arrangement of waveguides 12, 14, and 16 formed in channels on a substrate 15 shown in FIG. 1. Coupling takes place over the length L where the spacing between the guides is at a minimum. U.S. Pat. No. 4,772,084 teaches an optical power splitter that uses the central port and suffers from the problem of power division. U.S. Pat. No. 5,009,692 discloses a method of making a fiber optic coupler which includes three fibers. As shown in FIG. 14, the fiber.; are arranged in triangular form inside a tube. To form the coupling region the fibers are heated and elongated to reduce the diameters so that coupling takes place, as described on column 3, lines 13–29, and column 12, lines 33–35. U.S. Pat. No. 5,170,451 discloses a wavelength division multiplexer which is formed of three optical fibers fused together in a central section shown in FIG. 2. As noted in column 4, the coupling section is formed by heating and drawing the fibers until the light intensity at the output ports is at the desired value. U. S. Pat. No. 5,170,451 teaches a fiber coupler in which coupling is performed with a central port, which results in the power being divided equally to the external side ports. U.S. Pat. No. 5,195,151 discloses a 3×3 star fiber coupler having several fibers fused together and drawn at the fused section until the desired coupling takes place shown in FIG. 1a–1e, as described on column 3, lines 25–44. U.S. Pat. No. 5,459,804 teaches a fiber coupler having spacer fibers with no cores. In FIG. 1, a symmetrical coupler is formed by fuse drawing the fibers in the coupling region. FIG. 2 shows a coupler where the fused drawn region has been twisted. FIGS. 6B and 6C show three fibers 36 included in a ribbon structure that can be formed into a coupler by fuse drawing. The fibers may also be twisted as described in column 6, lines 54–66.

SUMMARY OF THE INVENTION

The invention provides a single 3×3 coupler, which in a preferred embodiment is made by laterally fusing and elongating 3 single-mode fibers. The single 3×3 coupler has 3 input ports and 3 output ports. The single fusion 3×3 coupler allows bidirectional transmission of optical signals at two different wavelengths. The single fusion 3×3 coupler performs a function of multiplexer in one direction. Two different wavelength signals are injected in two specific input ports and are combined in one of the output ports called a system port. In the opposite direction, signals coming from the system port are partially routed to a third input port, allowing a detector to be connected at the third input port. In this configuration, the coupler is used as a 3×1 multiplexer/tap coupler.

In another application, the single 3×3 coupler has one or two of the other output ports that are used to monitor the optical signal at one or two wavelengths. The single 3×3 coupler is then used as a 3×2 or 3×3 multiplexer-tap/tap configuration.

The single 3×3 coupler may be designed using standard telecommunication matched cladding single-mode fibers. It operates in the 1310 and 1550 nanometer wavelength windows. Its parameters are optimized as to have a 4 dB maximum insertion loss at 1310±30 nanometer and 1550±30 nanometer to and from the system port and a maximum insertion in both directions of better than 7.5 dB at any given wavelength in the operating windows.

One important advantage of the invention over the prior art in that the single 3×1 coupler performs the same function with a reduced the number of components in the system, as well as minimizing the system power loss, typically 4 dB in each direction.

BRIEF DESCRIPTION OF DRAWING

The invention, both as to its organization and manner of operation, may be further understood by reference to a drawing (not drawn to scale) which includes FIGS. 1–11 taken in connection with the following description.

DESCRIPTION OF THE BEST MODE OF THE INVENTION

Figure 2:
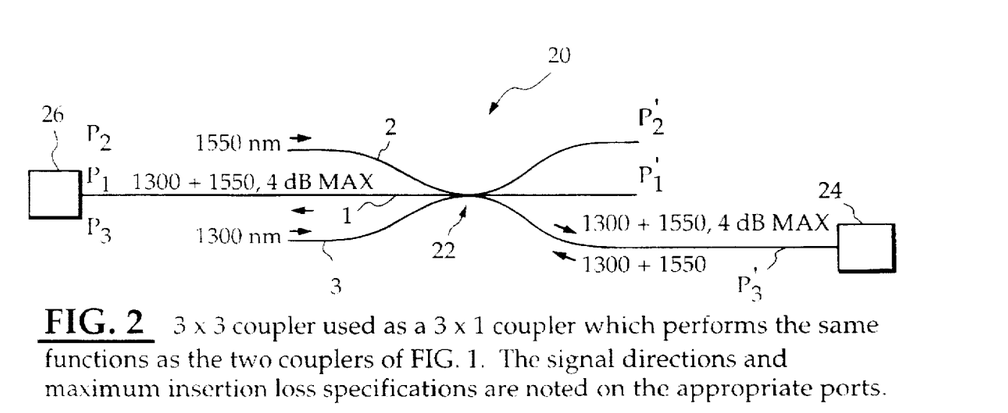
FIG. 2 is diagram of a single 3×3 coupler of the present invention.

FIG. 2 shows the present invention which is a single 3×3 coupler used as a 3×1 coupler and which performs the same functions as the two prior art couplers shown in FIG. 1. The signal directions and maximum insertion loss specifications are noted on the appropriate ports.

Several technologies can be used to produce fiber couplers, mainly fused fiber technology, integrated optics, either on glass or on silicon, and micro-optics. The principles involved with this invention can be used in any waveguide technology, but the invention itself was first applied to fused fiber coupler technology.

As shown in FIG. 2, the fused fiber optic coupler is generally indicated as 20, and includes three fibers 1, 2, 3, a single fused coupler 22, a central input port P1, and two side input ports P2, P3, as well as a central output port P1', and two side output ports P2', P3'.

In the forward direction, in the fused fiber optic coupler the side input port P2 responds to and provides a first forward optical signal having a wavelength of 1550 nanometers. The side input port P3 responds to and provides a second forward optical signal having a wavelength of 1300 nanometers. The single fused coupler 22 responds to the first forward optical signal and the second forward optical signal, and provides a coupled first and second forward optical signal having a combined wavelength of 1300 and 1550 nanometers. The side output port P3' is a system port that responds to and provides the coupled first and second forward optical signal having the combined wavelength of 1300 and 1550 nanometers to the fiber optic system generally indicated as 24 with a maximum of a 4 dB insertion loss.

In the reverse direction, the side output port P3' responds to and provides a combined first and second reverse optical signal having a combined wavelength of 1300 and 1550 nanometers from the fiber optic system 24 to the single fused coupler 22. The single fused coupler 22 responds to the combined first and second reverse optical signal and provides a coupled first and second reverse optical signal having a combined wavelength of 1300 and 1550 nanometers to a central input port P1. The central input port P1 is a detector port that responds, to and provides the coupled first and second reverse optical signal with a maximum of a 4 dB insertion loss to a detector 26 or other device.

It is important to note that the scope of the invention is not intended to be limited to any particular value of the wavelength of the respective optical signals.

In a preferred embodiment, the fused fiber optic coupler 20 is made by laterally fusing the three optical fibers 1, 2, 3 and elongation the fused structure until coupling occurs between the fiber. The fusing technology is known in the art and shown and described, for example, in U.S. Pat. Nos. 4,765,816; 4,822,128; 4,895,423; 5,170,451; 5,195,151 and 5,459,804, all hereby incorporated by reference. For example, during the fusion method the fibers 1, 2, 3 are pulled, and the pulling is stop when a desired amount of coupling is reached, and the coupler is then glued on a substrate and packaged. Fiber pigtails output the packaged making this component easy to integrate in a fiber system by standard splicing procedures. Though this procedure always produces N×N couplers, where N is greater than 3, the unused fiber pigtails can be cut off and terminated inside the package, thus creating to the external user an M×N package. The procedures to fabricate the WDM coupler and the 3 dB wavelength flattened coupler are well known in the arts and the two 2×2 couplers can easily be connected together but this concatenation is more cumbersome than a single coupler packaged, thus the interest in fabricating an integrated version 3×3 coupler.

Figure 3:
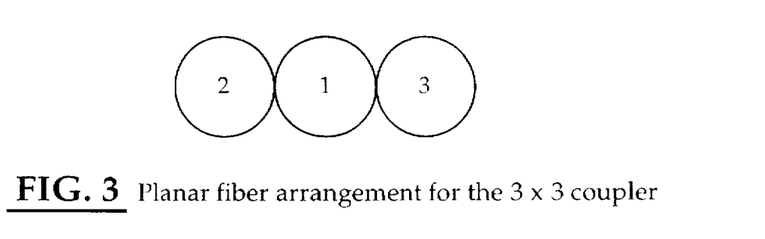
FIG. 3 is a diagram of a planar fiber arrangement for the single 3×3 coupler.

FIG. 3 show a planar fiber arrangement in which the three fibers 1, 2, 3 are placed in a same plane. The planar arrangement is the one that was found to work very well for the present invention as the insertion loss obtained is better than 4 dB. The scope of the invention is not intended to be limited to only the planar arrangement shown in FIG. 3. It is envisioned that several geometry can be used when three fibers 1, 2, 3 are fused at the same time. In a triangular arrangement, it is possible to realize an equal splitting ratio between all ports. However, in the prior art even if the splitting ratio was wavelength independent, the insertion loss of the system may be 4.8 dB which is high.

Figure 4:
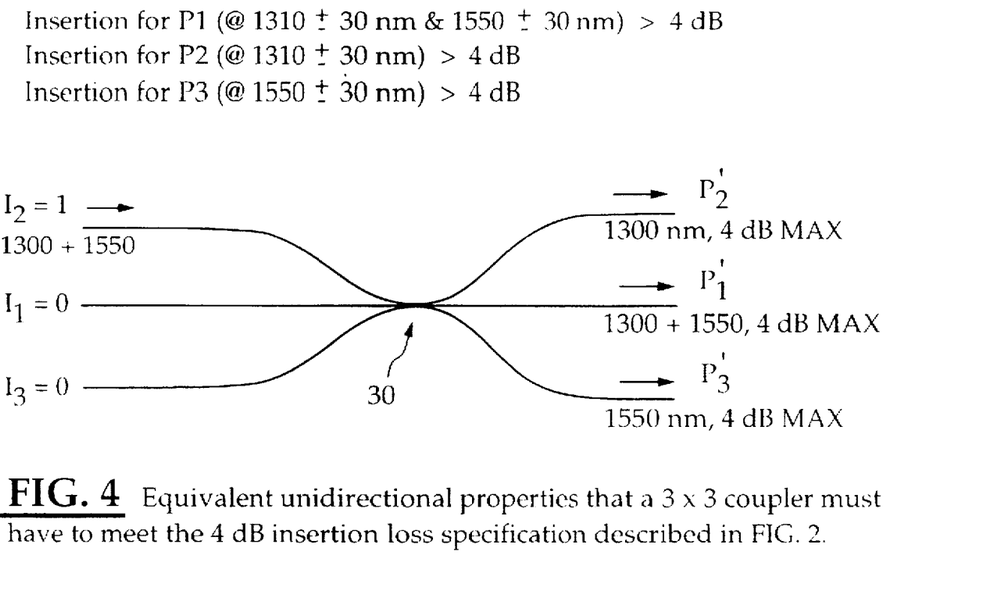
FIG. 4 is a diagram of a 3×3 coupler having equivalent unidirectional properties that a coupler must have to meet a 4 dB insertion power loss specification for the present invention shown in FIG. 2.

To design the 3×3 fusion coupler of the present invention, one takes advantage of the fact that couplers, and the fused fiber optic coupler 20 in particular, are bidirectional devices. This means that the coupler function exactly the same way in one direction than the other if the ports are not cut off. Thus, the bidirectional properties of the fused fiber optic coupler in FIG. 2 can be obtained with a 3×3 coupler that has the unidirectional properties of the coupler generally indicated as 30 shown in FIG. 4, wherein:

Insertion for P1 (@1310±30 nm & 1550±30 nm)>4 dB

Insertion for P2 (@1310±30 nm)>4 dB

Insertion for P3 (@1550±30 nm)>4 dB

In the 3×3 coupler 20 of the present invention, the transmission of the planar arrangement is approximated by the following equations:

$$P1 = \tfrac{1}{2}\sin^2\alpha \text{ (central branch fiber 1)},$$

$$P2 = \tfrac{1}{4}(1+\cos\alpha)^2 \text{ (one side branch fiber 2)},$$

$$P3 = \tfrac{1}{4}(1-\cos\alpha Q)^2 \text{ (other side branch fiber 3)},$$

where P1 is the transmission of the central branch fiber 1, P2 is the output transmission of the input branch fiber 2 and P3 is the transmission of the opposite branch fiber 3. A parameter α is the accumulated phase difference between the antisymmetric mode and a mean value of the symmetric modes. The parameter α depends on the length of the coupler and on the wavelength.

In the 3×3 coupler 20 of the present invention, because of the wavelength dependence of α, the coupling ratios at the two operating wavelengths will not be the same and that because of that dependence the wavelength dependent multiplexing properties between ports 2 and 3 can be obtained for the transmission signals, both wavelengths being combined in the output of fiber 2 hereby called the system port.

The power in the central fiber 1 can be greater than 4 dB at the same time that the multiplexed power is greater than 4 dB in the system port P3'.

It is important during the making of the 3×3 coupler 20 to adjust the coupler parameter so that the conditions are met even if the coupler response differs from the basic equation, and to tune this coupler to the right properties, during and after fusion and/or elongation.

Figure 5:
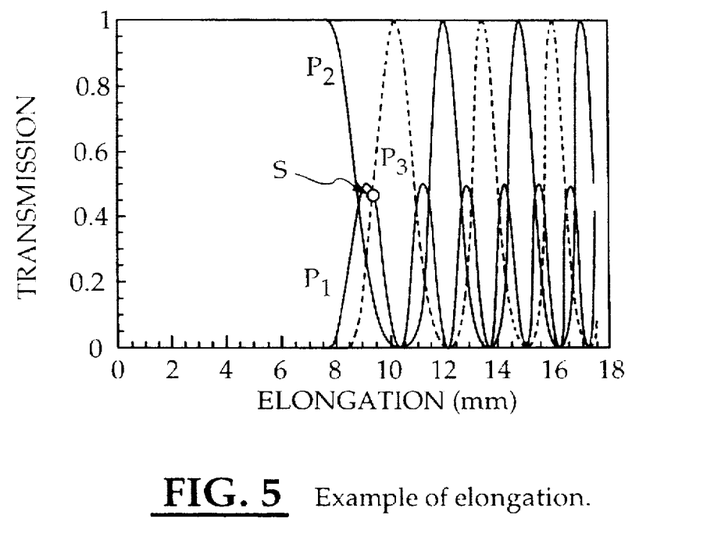
FIG. 5 is a graph of elongation (mm) versus a normalized transmission power (unitless) for making the 3×3 coupler of the present invention shown in FIG. 2.

To make the coupler, one must have a setup that can align three uncoated fibers 1, 2, 3 shown in FIG. 3 and hold them while they are being fused and elongated. The setup must also be able to monitor the different outputs of the coupler as to give indication as where to stop the elongation procedure. As a function of elongation, the coupler response, at a single wavelength, could look like that shown in FIG. 5, which shows an example of a simulation. The transmission power is shown to be unitless since it represents a normalized input power divided by the output power. The point S is the stop point of elongation needed to obtain the dual wavelength multiplexing/tap properties.

Figure 6:
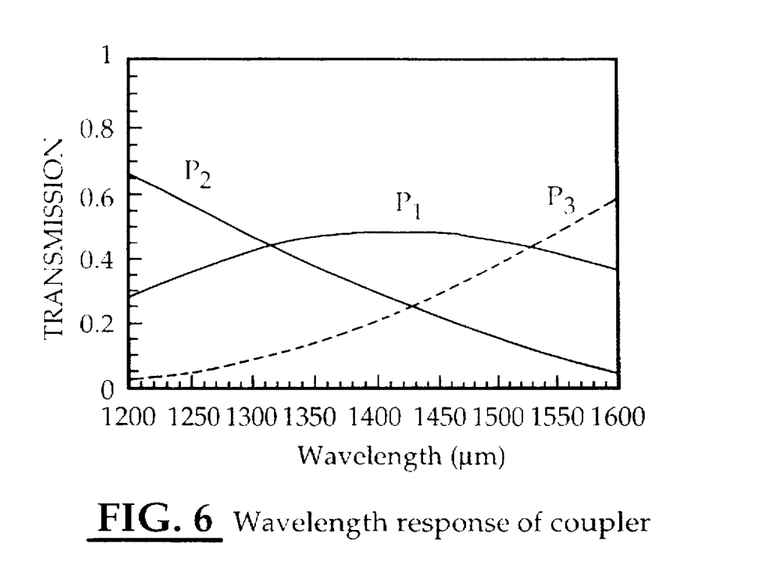
FIG. 6 is a graph of wavelength (μ) versus a normalized transmission power (unitless) for a wavelength response of the present invention shown in FIG. 2.

If the elongation is stopped at point S, for a 1550 nanometer wavelength, and if the longitudinal profile is adjusted for the wavelength dependence to be right, the wavelength response would look like FIG. 6.

Figure 7:
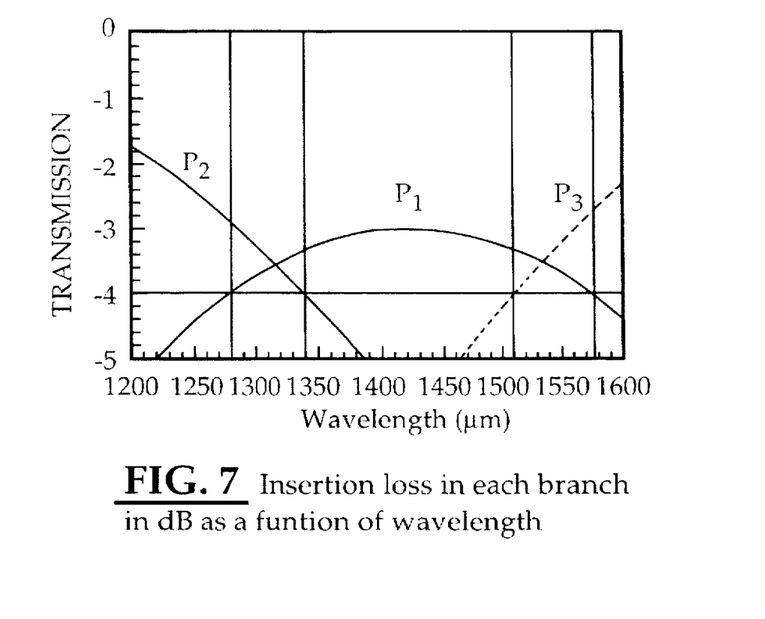
FIG. 7 is a graph of wavelength (μ) versus a normalized transmission power (unitless) for analyzing an insertion loss in each branch in dB as a function of wavelength.

FIG. 7 shows that the coupler of the present invention satisfies the 4 dB condition if one looks at the response in dB and superimpose the operating window and maximum insertion loss.

It was observed that the wavelength response of a 3×3 coupler differed from FIG. 7 by not being symmetric compared to the maximum of the P1 transmission as a function of wavelength.

It was found that this problem could be eliminated by twisting the coupler after elongation and thus tuning the response to meet the specification at both wavelengths.

Figure 8:
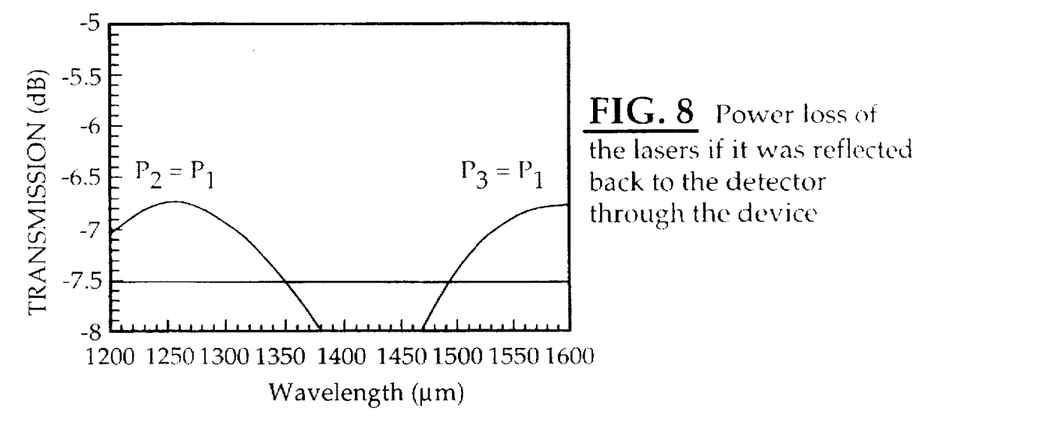
FIG. 8 is a graph of wavelength (μ) versus a normalized transmission power (unitless) for analyzing a power loss.

Furthermore, it was observed that the coupler specification could be optimized for certain applications. An example is for Optical Time Domain Reflectory (OTDR) or back reflection measurement systems. These systems can use the present invention in a bidirectional configuration but have the particular property that the wavelengths are exactly the same in both directions because the return power results for a reflection in the fiber system. The important characteristic for the component in this case is the double pass insertion loss, that is, the sum of the insertion loss from the laser to the system fiber and the insertion loss from the system fiber to the detector. The specification goal is than 8 dB. However, because of the wavelength dependence of this coupler, it was found that this property is achieved over a much wider wavelength range as shown in FIG. 8. The optimum is even better than 6.8 dB. Over the target wavelength range, a specification of 7.4 dB can easily be achieved. By adjusting the period of the coupler, the double pass specification can be optimized.

Figure 9:
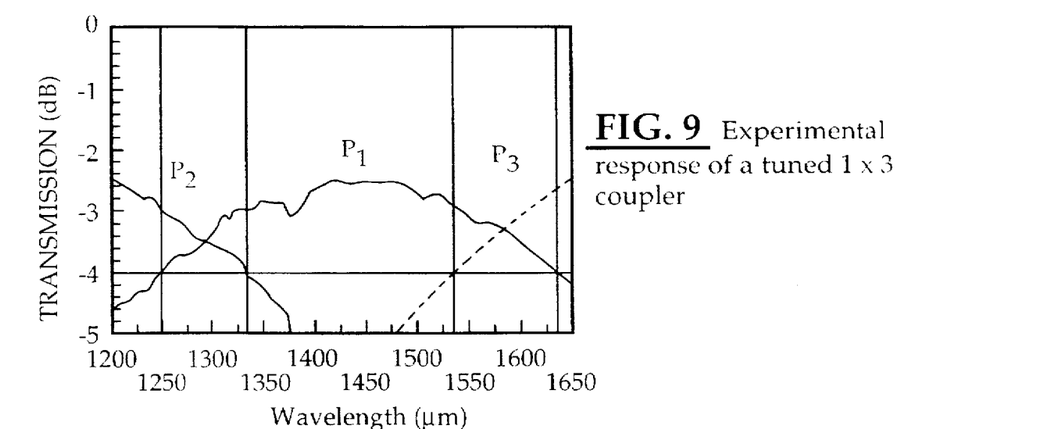
FIG. 9 is a graph of wavelength (μ) versus transmission of an experimental response of a tuned 1×3 coupler.
Figure 10:
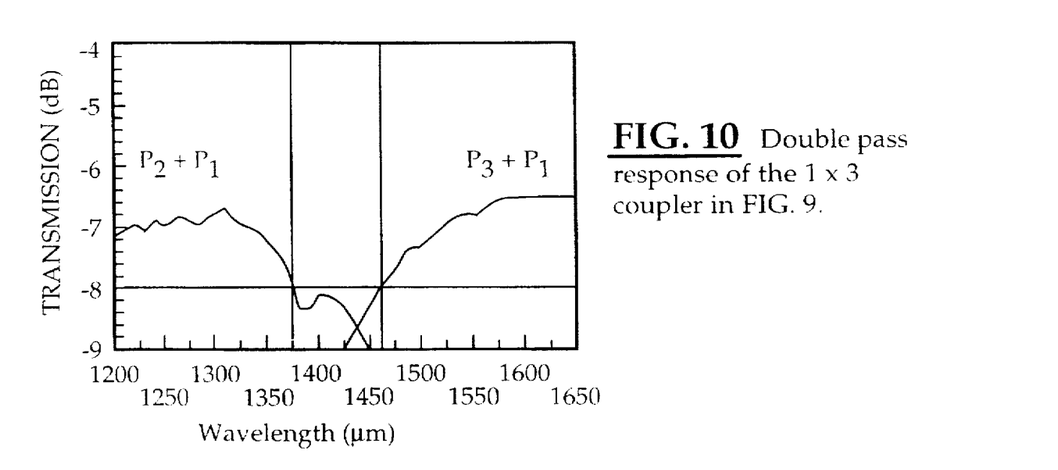
FIG. 10 is a graph of wavelength (μ) versus a normalized transmission power (unitless) of a double pass response of the 1×3 coupler in FIG. 9.

A typical wavelength response for the 3×3 coupler 20 shown in FIG. 2 is shown in FIG. 9 and its double pass response is shown in FIG. 10. As can be seen in FIGS. 9 and 10, experimental responses can be even better than what the simple model predicts. This is due to the fact that the simple model neglects an important phenomenon that is the coupling between the supermodes of the coupler.

The present invention includes a method for making an optic coupler shown in FIG. 2 for a fiber optic system. Such a method may include the steps of: providing three fibers 1, 2, 3 in a planar arrangement as shown in FIG. 3; providing a first side port optical signal having at least one wavelength to a first side port P2; elongating and fusing the three fibers 1, 2, 3; and forming a single optical coupler 22 that responds to the first side port optical signal, for providing a coupled optical signal to a side system port p3' to be coupled to the fiber optic system 24. Consistent with that discussed above, the wavelengths of the first side port optical signal may be 1300 and/or 1550 nanometers, although the scope of the invention is not intended to limited to any particular wavelength.

The method may also includes the steps of: providing a second side port optical signal to a second side port P3; and forming the single optical coupler for responding to the second side port optical signal, and for providing the coupled optical signal to the side system port P3' to be coupled to the fiber optic system 24. In this case, the first and second side port optical signals may respectively have wavelengths of 1300 and/or 1550 nanometers, although the scope of the invention is not intended to limited to any particular wavelength.

In the present invention, supermode coupling may be used to modify the response of a 3×3 coupler. The coupling can be controlled by the longitudinal profile of the single optical coupler and by pulling, pushing, and/or twisting of the planar arrangement of three fibers 1, 2, 3 shown in FIG. 3 for tuning the formation of the single optical coupler 22. With this control, high device performance can be achieved.

Figure 11A:
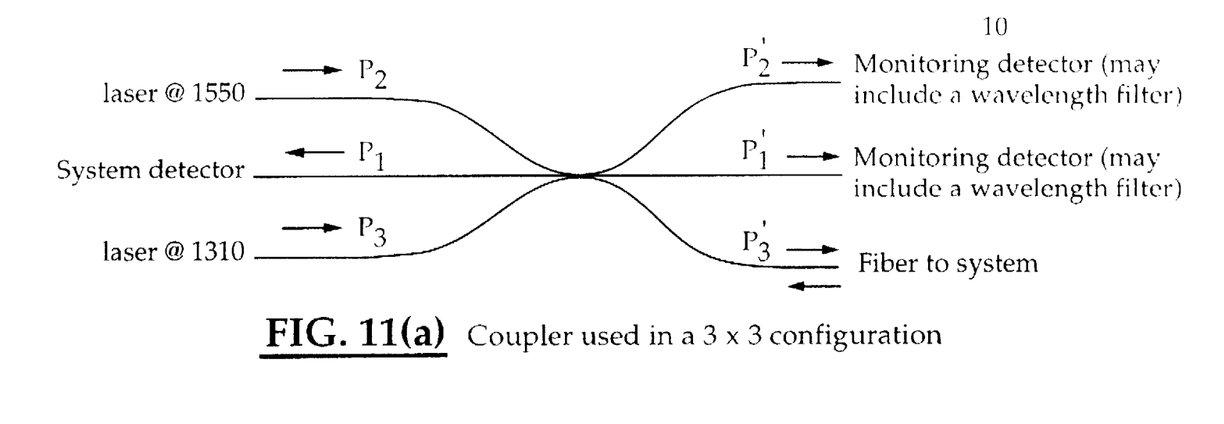
FIG. 11 is a diagram of coupler used in a 2×3 or 3×3 configuration.
Figure 11B:
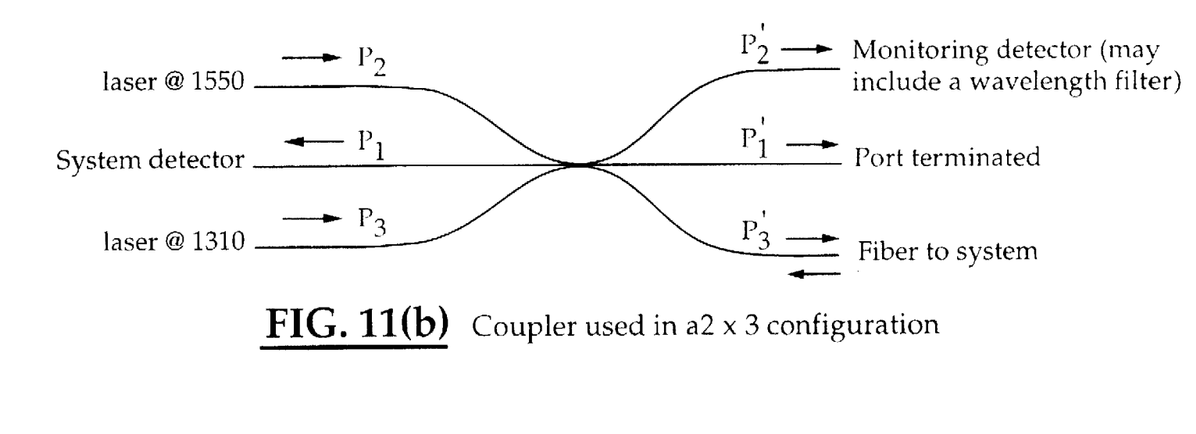

The 1×3 coupler of the present invention can be used as a 2×3 or 3::3 if the other input leads are not cut off. Since part of the optical power is coupled to those ports, typical 10% for the external port and 40% for the central port in both wavelength windows, the port can be used to, for example, monitor the different laser in the application discussed above, the 3×3 coupler would be set up as shown in FIG. 11.

The advantages of using the external side port to place the monitoring detector is that the back reflection isolation to the laser and the system detector is greater for this port (typically 20 dB for the signal laser and 14 dB for the two other ports) than the central fiber (that are 8 and 11 dB respectively). This is an important feature and advantage that is not present in the prior art couplers.

In effect, the present invention is using a wavelength dependence of the coupler because of the side inputs there is essentially a multiplexing effect which has a wavelength dependence, as shown in FIG. 9. FIG. 9 shows that there is there is always a lot of power in the port P1, which is the center port. However, there is a lot of power in the port P2 around the wavelength 1300 nanometers, and a lot of power in the port P3 around the wavelength 1550 nanometers, so an inversion takes place at the wavelength 1300 nanometers and the power is *n the port P2, and at the wavelength 1550 nanometers the power is in the port P3, but substantially not in the port P2 anymore. Even though there is 10% power left in the port P2, there is a wavelength dependence that there is more power globally at both wavelengths in the external side ports P2 and P3 than would be left, for example, if the optical signal enter the central port P1. In comparison, in U.S. Pat. No. 5,170,451 the coupler always has power in the central port P1, but the coupler automatically looses half of the power being coupled in the outer fibers because the power is divided in two, which is known in the art as a power division problem in such a coupler. The present invention overcomes the power division problem because there is a shift from the port P2 to the port P3, and the coupler uses most of the power all of the time, and the power is not divided in two.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What I claim is:

1. An optic coupler for a fiber optic system, comprising:
  a first optical port responsive to and for providing a first forward optical signal;
  a second optical port responsive to and for providing a second forward optical signal;
  single coupling means, responsive to the first forward optical signal, and further responsive to the second forward optical signal, for providing a coupled first and second forward optical signal, and further responsive to a combined first and second reverse optical signal, for providing a coupled first and second reverse optical signal;
  a system port responsive to and for providing the coupled first and second forward optical signal to the fiber optic system, and further responsive to and for providing the combined first and second reverse optical signal to the single coupling means; and
  a detector port, responsive to and for providing the coupled first and second reverse optical signal.

2. An optic coupler according to claim 1, wherein the single coupling means is a single fusion 3×3 coupler.

3. An optic coupler according to claim 1, wherein the single coupling means is an integrated optics 3×3 coupler.

4. An optic coupler according to claim 1, wherein the single coupling means is a micro optics 3×3 coupler.

5. An optic coupler according to claim 1,
  wherein the first optical port responds to and provides the first forward optical signal having a wavelength of 1300 nanometers;
  wherein the second optical port responds to and provides the second forward optical signal having a wavelength of 1550 nanometers;
  wherein the single coupling means responds to the first forward optical signal and the second forward optical signal, for providing the coupled first and second forward optical signal having a combined wavelength of 1300 and 1550 nanometers; and
  wherein the system port responds to and provides the coupled first and second forward optical signal having the combined wavelength of 1300 and 1550 nanometers with a maximum of a 4 dB insertion loss.

6. An optic coupler according to claim 1, wherein the system port responds to and provides the combined first and second reverse optical signal having a combined wavelength of 1300 and 1550 nanometers to the single coupling means; and
  wherein the single coupling means further responds to the combined first and second reverse optical signal, and provides the coupled first and second reverse optical signal having a combined wavelength of 1300 and 1550 nanometers;
  a detector port, response to and provides the coupled first and second reverse optical signal to a detector with a maximum of a 4 dB insertion loss.

7. An optic coupler according to claim 1, wherein the single coupling means is a single fusion N×N coupler, where N is greater than or equal to 3.

8. An optic coupler according to claim 1,
  wherein the single coupling means is a single fusion 3×3 coupler made from a planar fiber arrangement having three fibers with a central fiber branch and two side fiber branches;
  wherein the first optical port is an input port of one of the two side fiber branches;
  wherein the second optical port is another input port of another one of the two side fiber branches; and
  wherein the system port is an output port of the two side fiber branches.

9. An optic coupler according to claim 8, wherein the detector port is an input port of the central fiber branch.

10. An optic coupler according to claim 9, wherein the three fibers are single mode fibers.

11. An optic coupler according to claim 10, wherein the single coupler means has a 4 dB maximum insertion loss at a range of 1280–1340 nanometers and 1520–1580 nanometers to and from the system port and a maximum insertion in both forward and reverse directions of better than 7.5 dB at any given wavelength in the operating windows.

12. An optic coupler according to claim 1, wherein the optic coupler is a 3×1 multiplexer/tap.

13. An optic coupler according to claim 1,
  wherein the optic coupler is a 2×3 multiplexer-tap/tap configuration;
  wherein the single coupling means further provides a coupled first forward optical signal; and
  wherein the optic coupler further comprises a first monitoring port that responds to and provides the coupled first forward optical signal to a first monitoring device.

14. An optic coupler according to claim 1,
  wherein the optic coupler is a 3×3 multiplexer-tap/tap configuration;
  wherein the single coupling means further provides a coupled first forward optical signal;
  wherein the single coupling means further provides a coupled second forward optical signal;
  wherein the optic coupler further comprises a first monitoring port that responds to and provides the coupled first forward optical signal to a first monitoring device; and
  wherein the optic coupler further comprises a second monitoring port that responds to and provides the coupled second forward optical signal to a second monitoring device.

15. An optic coupler according to claim 1,
  wherein the single coupling means is a single fusion 3×3 coupler made from a planar fiber arrangement having three fibers with a central branch 1 and two side branches 2 and 3;
  wherein transmission branch characteristics are defined by the following equations:

$$P1 = \tfrac{1}{2} \sin^2 \alpha$$

$$P2 = \tfrac{1}{4}(1+\cos \alpha)^2$$

$$P3 = \tfrac{1}{4}(1-\cos \alpha)^2$$

where P1 is a transmission characteristic the central branch, P2 is an output transmission characteristic of an input side branch 2 and P3 is a transmission characteristic of an opposite side branch 3, and where a parameter $\alpha$ is an accumulated phase difference between an antisymmetric mode and a mean value of symmetric modes, and where the parameter $\alpha$ depends on the length of the coupler and on the wavelength.

16. An optic coupler according to claim 15,
wherein a central branch power in the central branch can be greater than 4 dB at a same time that a multiplexed power is greater than 4 dB in the system port.

17. An optic coupler according to claim 1,
wherein the first forward optical signal in a first bidirectional optical signal having a wavelength of 1300 nanometers;
wherein the second forward optical signal is a second bidirectional optical signal having a wavelength of 1550 nanometers; and
wherein the coupled first and second forward optical signal is a coupled first and second bidirectional optical signal having a combined wavelength of 1300 and 1550 nanometers.

18. An optic coupler for a fiber optic system, comprising:
a first side optical input port responsive to and for providing a first optical signal;
a second side optical input port responsive to and for providing a second optical signal;
single coupling means, responsive to the first optical signal, and further responsive to the second optical signal, for providing a coupled first and second forward optical signal, and further responsive to a combined first and second optical signal, for providing a coupled first and second reverse optical signal;
a side output port responsive to and for providing the coupled first and second forward optical signal to the fiber optic system, and further responsive to and for providing the combined first and second optical signal to the single coupling means; and
a central port, responsive to and for providing the coupled first and second reverse optical signal.

* * * * *